United States Patent [19]
Mermelstein et al.

[11] Patent Number: 5,995,923
[45] Date of Patent: Nov. 30, 1999

[54] METHOD AND APPARATUS FOR IMPROVING THE VOICE QUALITY OF TANDEMED VOCODERS

[75] Inventors: Paul Mermelstein; Rafi Rabipour, both of Cote St. Luc, Canada; William Navarro, Vélizy-Villacoublay, France; Paul Coverdale, Napean, Canada

[73] Assignee: Nortel Networks Corporation, Montreal, Canada

[21] Appl. No.: 08/883,353

[22] Filed: Jun. 26, 1997

[51] Int. Cl.⁶ .................................................. H03M 9/00
[52] U.S. Cl. ........................... 704/19; 704/262; 704/223
[58] Field of Search .................................... 704/219, 500, 704/501, 220, 221, 222, 223, 230, 262; 455/72, 560, 561, 93, 142; 370/477

[56] References Cited

U.S. PATENT DOCUMENTS

| | | | |
|---|---|---|---|
| 2,949,505 | 8/1960 | Kretzmer | 375/242 |
| 3,973,081 | 8/1976 | Hutchins | 704/230 |
| 5,497,396 | 3/1996 | Delprat | 375/220 |
| 5,581,652 | 12/1996 | Abe et al. | 704/222 |
| 5,602,961 | 2/1997 | Kolesnik et al. | 704/223 |
| 5,694,519 | 12/1997 | Chen et al. | 704/228 |
| 5,742,930 | 4/1998 | Howitt | 704/502 |
| 5,771,452 | 6/1998 | Hanley et al. | 455/445 |

FOREIGN PATENT DOCUMENTS

| | | |
|---|---|---|
| 0 138 073 | 4/1985 | European Pat. Off. |
| 96/19907 | 6/1996 | WIPO |

OTHER PUBLICATIONS

Wireless Communications Principles & Practice, by Theodore S. Rappaport, p. 361, 362, 389, 390, 491 497, Jan. 1996.

*Primary Examiner*—David R. Hudspeth
*Assistant Examiner*—Abul K. Azad
*Attorney, Agent, or Firm*—Foley & Lardner

[57] ABSTRACT

In recent years, the telecommunications industry has witnessed the proliferation of a variety of digital vocoders in order to meet bandwidth demands of different wireline and wireless communication systems. The rapid growth in the diversity of networks and the number of users of such networks is increasing the number of instances where two vocoders are placed in tandem to serve a single connection. Such arrangements of low bit-rate codecs can degrade the quality of the transmitted speech. To overcome this problem the invention provides a novel method and an apparatus for transmitting digitized voice signals in the wireless communications environment. The apparatus is capable of converting a compressed speech signal from one format to another format via an intermediate common format, thus avoiding the necessity to successively de-compress voice data to a PCM type digitization and then recompress the voice data.

35 Claims, 14 Drawing Sheets

A = LPC filter coefficient segment
B = Excitation segment

A = LPC filter coefficient segment
B = Excitation segment

| 10 reflection coefficients | Frame energy | Gain values for 4 subframes | Lag values for 4 subframes | Codebook (for excitation signal) information for 4 subframes |
|---|---|---|---|---|

IS 54 frame format

Figure 7a

| Reflection coefficients (4 sets of 10 dimensional LPC vectors) | Pitch delay for 4 subframes | Excitation signal (4 sets of 40 sample vectors corresponding to the 5 ms subframes) | Frame energy | Pitch Prediction Gain |
|---|---|---|---|---|

Common format frame

Figure 7b

Note: Shaded common format frame portion indicates that it is unused for this particular example, but can be used in another conversion.

| 10 LSP coefficients | Pitch delay for 4 subframes | Algebraic codes for 4 subframes | Gain values for 4 subframes |
|---|---|---|---|

IS 641 frame format

Figure 7c

METHOD AND APPARATUS FOR IMPROVING THE VOICE QUALITY OF TANDEMED VOCODERS

FIELD OF THE INVENTION

This invention relates to a method and to an apparatus for transmitting digitized voice signals, in a communications environment that can be of a wireless nature. More specifically, it relates to a method and to an apparatus for improving the quality of an audio signal that has been compressed or encoded with a digital signal processing technique, when the signal is transmitted from one terminal to another of a communication network.

BACKGROUND OF THE INVENTION

In recent years, the telecommunications industry has witnessed the proliferation of a variety of digital vocoders in order to meet bandwidth demands of different wireline and wireless communication systems. The name <<vocoder>> stems from the fact that its applications are specific to the encoding and decoding of voice signals primarily. Vocoders are usually integrated in mobile telephones and the base stations of the communication network. They provide speech compression of a digitized voice signal as well as the reverse transformation. Typically, a voice signal is digitized through one of many quantization techniques. Examples of these techniques are Pulse Amplitude Modulation (PAM), Pulse Code Modulation (PCM) and Delta Modulation. For the purposes of this description we will refer to PCM as the input format for the vocoder. Thus a vocoder includes an encoder stage that will accept as input a digitized voice signal and output a compressed signal, a possible compression ratio being 8:1. As for the reverse transformation the vocoder is provided with a decoder stage that will accept the compressed speech signal and output a digitized signal, such as PCM samples.

The main advantage of compressing speech is that it uses less of the limited available channel bandwidth for transmission. The main disadvantage is loss of speech quality.

Most modern low bit-rate vocoders are based on the linear prediction model that separates the speech signal into a set of linear prediction coefficients, a residual signal and various other parameters. Generally, the speech can be reconstructed with good quality from these components. However, degradations are introduced when speech is subjected to multiple instances of vocoders.

The rapid growth in the diversity of networks and the number of users of such networks is increasing the number of instances where two vocoders are placed in tandem to serve a single connection. In such a case, a first encoder is used to compress the speech of the first mobile user. The compressed speech is transmitted to a base station serving the local mobile where it is decompressed (converted to PCM format samples). The resulting PCM samples arrive at the base station serving the second mobile terminal, over the digital trunk of the telephone network, where a second encoder is used to compress the input signal for transmission to the second mobile terminal. A speech decoder at the second mobile terminal decompresses the received compressed speech data to synthesize the original speech signal from the first mobile terminal. A specific example of such a case may involve a call made from a wireless terminal operating according to the North American Time Division Multiplexing Access (TDMA) system to a European standard Global System for Mobile (GSM) mobile phone.

In an attempt to eliminate the condition of vocoder tandeming, a method called <<bypass>> has been proposed in the past. The basic idea behind this approach is the provision of a digital signal processor including a vocoder and a bypass mechanism that is invoked when the incoming signal is in a format compatible with the vocoder. In use, the digital signal processor associated with the first base station that receives the RF signal from a first mobile terminal determines, through signaling and control that an identical digital signal processor exists at the second base station associated with the mobile terminal at which the call is directed. The digital signal processor associated with the first base station rather than converting the compressed speech signals into PCM samples invokes the bypass mechanism and outputs the compressed speech in the transport network. The compressed speech signal, when arriving at the digital signal processor associated with the second base station is routed such as to bypass the local vocoder. Decompression of the signal occurs only at the second mobile terminal. The "bypass" approach is described in the international application serial number PCT 95CA704 dated Dec. 13, 1995. The contents of this disclosure are hereby incorporated by reference.

This solution is only valid, though, for identical vocoders. With the rapid expansion of networks, the diversity of vocoders is quickly increasing. The bypass solution is therefore useful only for a small portion of connections involving tandem vocoding.

Thus, there exists a need in the industry for devices capable of improving the voice quality during connections that may include incompatible tandemed vocoders.

OBJECTS AND STATEMENT OF THE INVENTION

An object of the invention is to provide an apparatus for processing audio signals that may reduce the signal degradation occurring when the signal is exchanged between two vocoders in a communication network.

Another object of the invention is to provide a method for reducing audio signal degradation when the signal is transmitted from one vocoder to another vocoder in a communication network.

As embodied and broadly described herein, the invention provides an apparatus for processing audio signals, said apparatus comprising an input and an output, said apparatus being responsive to a frame of compressed audio data of a first format applied to said input to generate at said output a frame of compressed audio data of a second format, the frame of first format having a coefficient segment and an excitation segment, the frame of the second format having a coefficient segment and an excitation segment, said apparatus including:

a) first processing unit connected to said input for receiving a coefficient segment of the frame of compressed audio data of the first format and issuing on said output the coefficient segment of the frame of compressed audio data of the second format;

b) second processing unit connected to said input for generating from the frame of compressed audio data of the first format, the excitation segment of the data frame of compressed audio data of the second format.

In a preferred embodiment of this invention, a pair of transcoders is provided to effect the transformation of compressed audio signals from one format to a different format. Each transcoder is provided with a pseudo-decoder to convert the incoming compressed audio signal into a common format that is then transported over the telephone company network toward the second transcoder. A pseudo-encoder at the remote transcoder processes the common format signal and transforms it into a compressed audio signal in a format different from the original compressed audio signal that was supplied to the first transcoder. To achieve a full duplex operation, each transcoder is provided with a pseudo-decoder to generate the common format signal and with a pseudo-encoder to transform the common format signal into compressed audio signal.

This system is advantageous particularly when the telephone network is provided with a variety of non-identical vocoders. To enable the exchange of speech signals from one vocoder to another vocoder, irrespective of whether they are identical or not, it suffices to convert the compressed audio signal issued by the local vocoder to the common format that can be processed by the pseudo-encoder of the remote vocoder. The common format can be defined as a compressed audio signal of an intermediate representation that is intended to convey important parametric information transmitted by the pseudo-decoder of the local vocoder directly to the pseudo-encoder of the remote vocoder. Such parametric information includes a coefficient segment and parameters describing an excitation segment of the speech signal being transmitted. One important element of the common format representation is that it retains the basic frame structure of the audio signal as it is encoded by one of the vocoders in the network that may be linked to one another during a given call. More specifically, the common format frame is comprised of a coefficient segment and an excitation segment, that will be defined below. It is important to note, however, that no attempt has been made to reduce the audio signal to PCM samples or to an equivalent representation, as a common format structure. This is not desirable because the transformation of the compressed signal to PCM and then the conversion of the PCM samples to compressed form introduces significant degradations in the signal quality that should be avoided as much as possible. The present inventors have discovered that by designing a common format configuration that-retains the basic structure of audio signals as encoded by a vocoder, those degradations are significantly reduced.

In this specification, the term "coefficient segment" is intended to refer to any set of coefficients that uniquely defines a filter function which models the human vocal tract. It also refers to any type of information format from which the coefficients may indirectly be extracted. In conventional vocoders, several different types of coefficients are known, including reflection coefficients, arcsines of the reflection coefficients, line spectrum pairs, log area ratios, among others. These different types of coefficients are usually related by mathematical transformations and have different properties that suit them to different applications. Thus, the term "coefficient segment" is intended to encompass any of these types of coefficients.

The "excitation segment" can be defined as information that needs to be combined with the coefficient segment in order to provide a complete representation of the audio signal. It also refers to any type of information format from which the excitation may indirectly be extracted. The excitation segment complements the coefficient segment when synthesizing the signal to obtain a signal in a non-compressed form such as in PCM sample representations. Such excitation segment may include parametric information describing the periodicity of the speech signal, an excitation signal as computed by the pseudo-decoder, speech framing control information to ensure synchronous framing in the pseudo-encoder associated with the remote vocoder, pitch periods, pitch lags, gains and relative gains, among others. The coefficient segment and the excitation segment can be represented in various ways in the signal transmitted through the network of the telephone company. One possibility is to transmit the information as such, in other words a sequence of bits that represents the values of the parameters to be communicated. Another possibility is to transmit a list of indices that do not convey by themselves the parameters of the common format signal, but simply constitute entries in a database or codebook allowing the pseudo-encoder to look-up this database and extract on the basis of the various indices received the pertinent information to construct the common format signal.

The expression "first format", "second format" or "third format" when used to describe the audio signal in compressed form, either in the common format representation or in the format of a given vocoder, refers to signals that are, generally speaking, not compatible, although they share a common basic structure, in other words they are divided into coefficient segment and excitation segment. Thus, a vocoder capable of converting a signal under the first format will not, generally speaking, be capable of processing a signal expressed under any other format than the first format.

In a preferred embodiment, the transformation of audio signal in the compressed form to the common format is effected in two steps. The first step is to process the coefficient segment in the compressed audio signal data frame to generate the coefficient segment of the common format. Generally speaking, the transformation, from one type of coefficient to another, is effected by well-known mathematical algorithms. Depending upon the kind of vocoder associated with the pseudo-decoder, this transformation may be effected simply by re-quantizing the coefficient from the compressed audio signal data frame into new values that would constitute the coefficient of the common format data frame. In the next step, the excitation segment of the common format data frame is obtained by processing the frame energy, gain values, lag values and codebook information (as would the decoder portion of a vocoder normally) and quantize the excitation signal before forming a common format data frame. The transformation from the common format data frame to compressed audio signal by a pseudo-encoder is effected in a similar manner as described earlier. The coefficient segment of the common format data frame is processed first to generate the coefficient segment of the compressed audio signal data frame. The excitation segment of the compressed audio signal data frame is obtained by first synthesizing a speech signal by passing the common format excitation segment through a filter for which the coefficient were also obtained from the common format. This signal is applied to the encoder portion of the vocoder as it would ordinarily. Another possibility for obtaining the excitation segment in one format from a data frame in another format, without synthesizing an audio signal and then effecting an analysis, is to re-compute the excitation segment solely from data available in the excitation segment in the source data frame. The choice of this method or the method described above will depend upon the intended application or the type of conversion that is being required. More specifically, certain formats of compressed audio signals can be easily converted to the common frame by re-computing the segments of each frame independently from one another. In other instances, however, it is more practical to use an analysis-by-synthesis approach to obtain the excitation segment.

As embodied and broadly described herein the invention further provides an apparatus for transmitting a data frame of compressed audio information, said apparatus including:

a) a first transcoder including a first input and a first output, said first transcoder being responsive to a frame of compressed audio data of a first format applied to said input to generate at said output a frame of compressed audio data of a second format, the frame of first format having a coefficient segment and an excitation segment, the frame of the second format having a coefficient segment and an excitation segment;

b) a second transcoder including a second input and a second output, said second input being linked to said first output to receive the frame of compressed audio data of a second format, said second transcoder-being responsive to a frame of compressed audio data of a second format applied to said second input to generate at said second output a frame of compressed audio data of a third format, the frame of third format having a coefficient segment and an excitation segment.

As embodied and broadly described herein, the invention provides a method for processing a data frame representative of audio information in digitized and compressed form, the data frame including a coefficient segment and a excitation segment, the data frame being in a first format, said method comprising the steps of:

a) processing the coefficient segment of the data frame in the first format to generate a coefficient segment of a data frame in a second format;

b) processing the data frame in the first format to generate an excitation segment of a data frame in a second format;

c) combining the coefficient segment of a data frame in a second format with the excitation segment of a data frame in a second format generated at steps a) and b), respectively to generate a data frame of a second format representative of the audio information contained in the data frame of the first format.

As embodied and broadly described herein, the invention provides a method of transmission of a data frame representative of audio information in digitized and compressed form, the data frame including a coefficient segment and a excitation segment, the data frame being in a first format, said method comprising the steps of:

a) processing at a first site the data frame in the first format to generate a data frame of a second format, the data frame of a second format including a coefficient segment and an excitation segment;

b) transmitting the data frame of a second format to a second site remote from said first site;

c) processing at said second site the data frame of a second format to generate a data frame of a third format, the data frame of a second format including a coefficient segment and a excitation segment.

As embodied and broadly described herein, the invention provides a method for transmitting audio signals between incompatible vocoders, said method comprising the steps of:

a) receiving from a first vocoder a data frame of a first format, the data frame including a coefficient segment and an excitation segment;

b) converting the data frame of a first format into a data frame of intermediate format that includes the sub-steps of:
   i) processing the coefficient segment of the data frame in the first format to generate a coefficient segment of a data frame in the intermediate format;
   ii) processing the data frame in the first format to generate an excitation segment of a data frame in the intermediate format;
   iii) combining the coefficient segment of a data frame in the intermediate format with the excitation segment of a data frame in the intermediate format to generate a data frame of an intermediate format representative of the audio information contained in the data frame of the first format, c) converting the data frame of an intermediate format into a data frame of a third format that includes the sub-steps of:
   i) processing the coefficient segment of the data frame in the intermediate format to generate a coefficient segment of a data frame in the third format;
   ii) processing the data frame in the intermediate format to generate an excitation segment of a data frame in the third format;
   iii) combining the coefficient segment of a data frame in the third format with the excitation segment of a data frame in the third format to generate a data frame of a third format representative of the audio information contained in the data frame of the first format and of the intermediate format, d) transmitting the data frame of the third format to a second vocoder.

As embodied and broadly described herein the invention also provides a machine readable storage medium containing a program element for instructing a computer to process audio signals, said computer comprising an input and an output, said program element causing said computer to be responsive to a frame of compressed audio data of a first format applied to said input to generate at said output a frame of compressed audio data of a second format, the frame of first format having a coefficient segment and an excitation segment, the frame of the second format having a coefficient segment and an excitation segment, said program element implementing in said computer functional blocks including:

a) first processing unit connected to said input for receiving a coefficient segment of the frame of compressed audio data of the first format and issuing on said output the coefficient segment of the frame of compressed audio data of the second format;

b) second processing unit connected to said input for generating from the data frame of compressed audio data of the first format the excitation segment of the data frame of compressed audio data of the second format.

As embodied and broadly described herein the invention further provides an inter-vocoder interfacing node for converting a frame of compressed audio signal in a first format to a frame of compressed audio signal in a second format, the frame of first format having a coefficient segment and an excitation segment, the frame of the second format having a coefficient segment and an excitation segment, said node including:

a) a first transcoder including a first input and a first output, said first transcoder being responsive to a frame of compressed audio data of a first format applied to said input to generate at said output a frame of compressed audio data of a intermediate format, the frame of the intermediate format having a coefficient segment and an excitation segment;

b) a second transcoder including a second input and a second output, said second input being linked to said first output to receive the frame of compressed audio data of an intermediate format, said second transcoder being responsive to a frame of compressed audio data of a intermediate format applied to said second input to generate at said second output a frame of compressed audio data of a second format.

BRIEF DESCRIPTION OF THE DRAWINGS

FIG. 7a illustrates a data frame in a IS 54 format;

FIG. 7b illustrates a data frame of the common format produced by the transcoder depicted in FIG. 5 or the transcoder depicted in FIG. 6;

FIG. 7c illustrates a data frame in the IS 641 format;

DESCRIPTION OF A PREFERRED EMBODIMENT

The following is a description of the Linear Predictive Coding (LPC) vocoder technology presently used in wireless telecommunications. One application of specific interest is the wireless transmission of a signal between a mobile terminal and a fixed base station. Another application is the transmission of speech over the internet communication network where different vocoders may be used in separate parts of the wireline network.

In communications applications where channel bandwidth is at a premium, it is essential to use the smallest possible portion of a transmission channel. A common solution is to quantize and compress the voice signal uttered by a user before it is transmitted.

Typically, the voice signal is first digitized by means of one of many quantization techniques. Examples of these techniques are Pulse Amplitude Modulation (PAM), Pulse Code Modulation (PCM) and Delta Modulation, PCM being perhaps the most popular. Basically, in PCM, samples of an analog signal are taken at a specified rate (8 kHz is common) and quantized into discrete values for representation in digital format.

Codecs, including an encoding and a decoding stage are then used to compress (and decompress) the digital signals at the source and reception point, respectively, in order to optimize the use of transmission channels. Codecs used specifically for voice signals are dubbed <<vocoders>> (for voice coders). By encoding only the necessary characteristics of a speech signal, fewer bits need to be transmitted than what is required to reproduce the original waveform in a manner that will not significantly degrade the speech quality. With fewer bits required, lower bit rate transmission can be achieved.

At present, most low bit-rate vocoders are of the Linear Predictive Coding (LPC) family that extracts pertinent speech features from a waveform in the time domain. Vocoders have two main components: an encoder and a decoder. The encoder part processes the digitized speech signal to compress it, while the decoder part expands compressed speech into a digitized audio signal.

An LPC-type vocoder uses a weighted sum of the past p samples of speech ($s_{n-k}$) to estimate the present sample ($s_n$). The number p determines the order of the model. The higher the order is, the better the speech quality. Typical model orders range from 10 to 15. It follows that an equation for a speech sample can be written as:

$$s_n = \sum_{k=1}^{p} a_k s_{n-k} + e_n$$

where $a_k$ is a coefficient which determines the contribution of the last $s_{n-k}$ sample, and $e_n$ is the error signal for the present sample.

Using the z-transform of $s_n$ and $e_n$, and defining a prediction filter we obtain:

$$s(z) = e(z) \frac{1}{A(z)}$$

where $$A(z) = 1 + \sum_{k=1}^{p} a_k z^{-k}$$

The filter $$\frac{1}{A(z)}$$

only has poles and is therefore called an all-pole filter.

Figure 1:
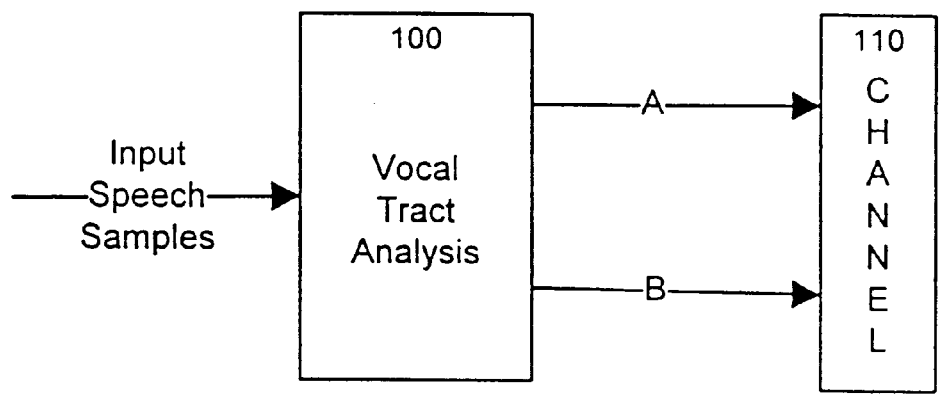
FIG. 1 is a block diagram of the encoder stage of a CELP vocoder.

FIG. 1 is a block diagram of the encoder portion of a generic model for a CELP vocoder. As can be seen from this figure, the input to the vocal tract analysis block 100 of the encoder part are PCM samples and the output consists of an LPC filter Coefficient segment and an excitation segment consisting of several parameters representing the prediction error signal (also called residual). The output is forwarded to a telecommunication channel.

The number of LPC filter coefficient in the coefficient segment is determined by the order p of the model. Examples of excitation segment parameters are: nature of excitation (voiced or unvoiced), pitch period (for voiced excitation), gain factors, energy, pitch prediction gain, etc. Code Excited Linear Prediction (CELP) vocoders are the most common type of vocoder used in telephony presently. Instead of sending the excitation parameters, CELP vocoders send index information which points to a set of vectors in an adaptive and stochastic code book. That is, for each speech signal, the encoder searches through its code book for the one that gives the best perceptual match to the sound when used as an excitation to the LPC synthesis filter.

A speech frame including this information is recalculated every T seconds. A common value for T is 20 ms. A 20 ms compressed speech frame represents 160 PCM samples taken at 8 kHz.

Figure 2:
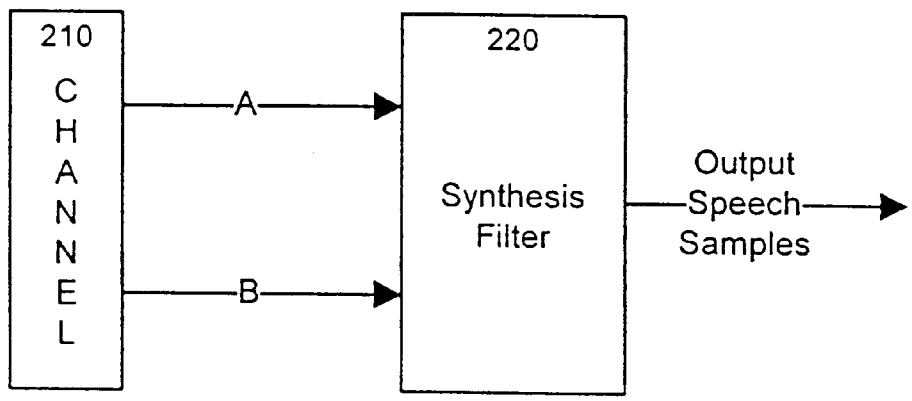
FIG. 2 is a bloc diagram of the decoder stage of an CELP vocoder.

FIG. 2 is a block diagram of the decoder portion of a generic model for a CELP vocoder. The compressed speech frame is received from telecommunication channel 210 and fed to an LPC synthesis filter 220. The LPC synthesis filter 220 uses the LPC filter coefficient segment and the excitation segment to produce and output speech signal usually in a PCM sample form.

A technique called interpolation is used as an enhancement to vocoders. It consists of the subdivision of the 20 ms speech frames into sub-frames of 5 ms and the interpolation of their predictor coefficient. This techniques is useful to avoid undesirable <<popping>> or <<clicking>> noises in the generated speech signal, that are usually the result of rapid changes in the predictor coefficient from one signal frame to the other. More specifically, each signal frame is divided into four sub-frames, that can be designated as sub-frame (1), sub-frame (2), sub-frame (3) and sub-frame (4), for reference purposes. The predictor coefficient used for speech signal generation over the first sub-frame, namely sub-frame (1), is a combination of the predictor coefficient for the previous frame with the coefficient for the current frame, in a ratio 75%/25%. For sub-frame (2), this ratio changes to 50%/50%, for sub-frame (3), the ratio reaches 25%/75%, while for the last sub-frame (sub-frame (4), the ratio is 0%/100%, in other words only the coefficient from the current frame are used.

Figure 3A:
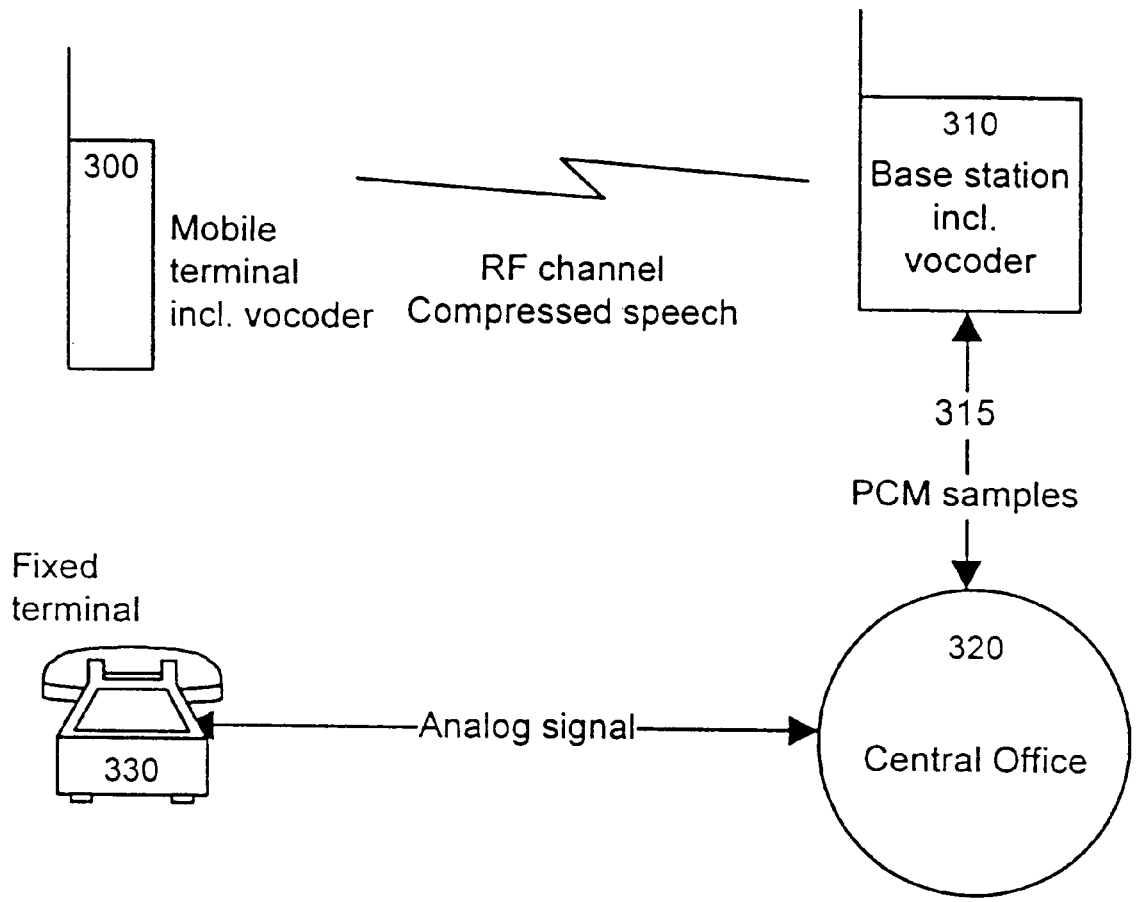
FIG. 3a is a schematic diagram of a communication link between a wireless mobile terminal and a fixed (wired) terminal.
Figure 3B:
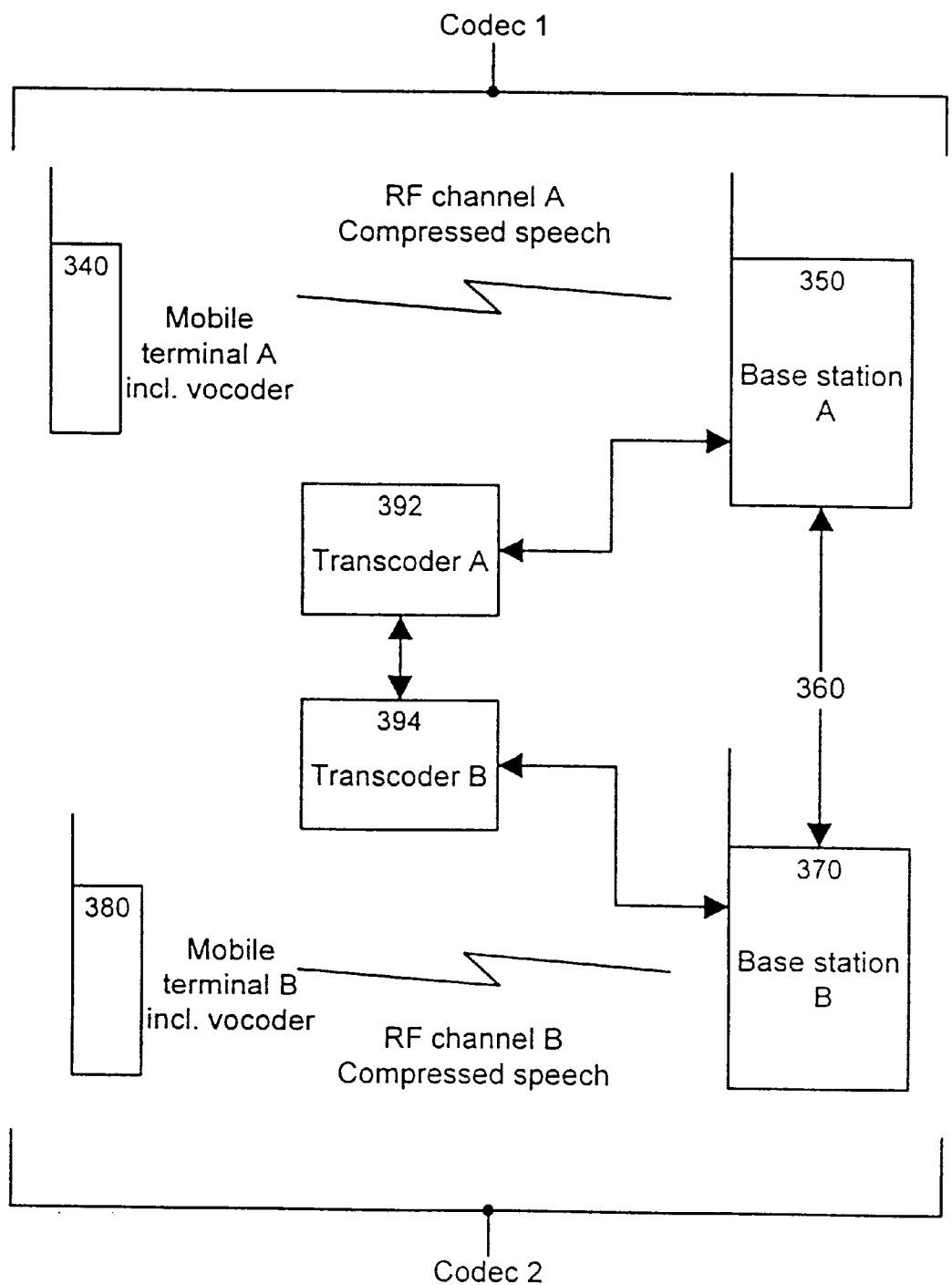
FIG. 3b is a schematic diagram of a communication link between two wireless mobile terminals with an embodiment of this invention including two transcoders.
Figure 3C:
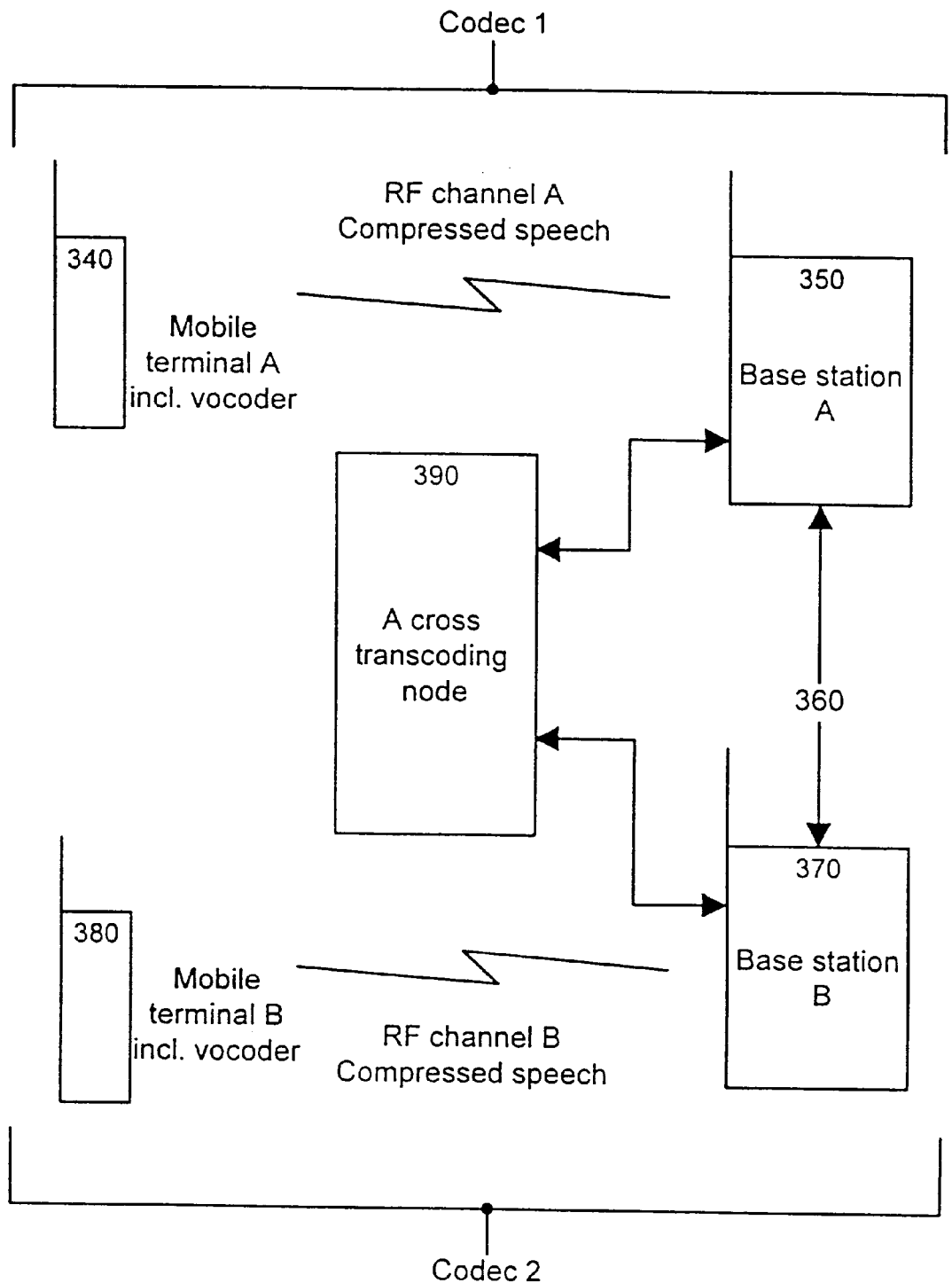
FIG. 3c is a schematic diagram of a communication link between two wireless mobile terminals with an embodiment of this invention including a cross transcoding node.

FIGS. 3a, 3b and 3c are schematics depicting telephone communications involving wireless links and embodying the CELP vocoder technology.

FIG. 3a is a schematic of a communications link between a wireless mobile terminal 300 and a fixed (wired) terminal 330. Speech is compressed (encoded) by a vocoder located in mobile terminal 300 and sent via a wireless link (RF channel) to a base station 310 where it is decoded into PCM samples by the decoder of a second vocoder. The signal is then directed, through various switches in the digital trunk of the telecommunication company network 315 to the central office 320 to which the fixed terminal 330 is physically connected. At the central office, the digital signal is converted into analog format and routed to the terminal 330. In such a scenario, speech is compressed and decompressed only once.

FIG. 3b is a schematic of a communications link between two wireless mobile terminals 340 and 380 with an embodiment of the invention including a two transcoders. Speech is compressed (encoded) by a vocoder located in mobile terminal A 340 and sent via a wireless link (RF channel A) to base station A 350 where it is decoded into PCM samples by the decoder of a second vocoder. The PCM samples are then sent via the telecommunication company network 360 to the second mobile terminal's base station B 370 where they are compressed (encoded) a second time by the second base station vocoder. The compressed signal is sent via a wireless link (RF channel B) to mobile terminal 380 where it is decoded a second time by the second mobile terminal's vocoder. Audible speech is then available at mobile terminal 380. FIG. 3b also shows an embodiment of the invention including two transcoders 392 and 394 which will be described in detail below.

FIG. 3c is a schematic diagram of a communication link between two wireless mobile terminals with an embodiment of this invention including a cross transcoding node 390. The cross transcoding node will be described in detail below.

This arrangement of vocoders is an example of what is called tandemed vocoding. Other examples of tandemed vocoding are situations where a wireless mobile terminal is communicating with a fixed wireless terminal, and when any type of wireless terminal is retrieving messages from a central voice-mail system that uses vocoders to compress speech before the data is stored. In such cases, speech is put through the compression and decompression algorithms of vocoders more than once. When vocoders are tandemed in such a manner, the quality of speech is usually degraded.

To compensate for degradations of the speech signal caused by tandemed connections of low bit-rate codecs (vocoders), a method called <<bypass>> was developed to eliminate the double decoding/encoding performed by vocoders in base stations 350 and 370. The basic idea behind this method is that base station A 350, knowing through signaling and control, that the vocoder in mobile terminal B 380 is identical with the vocoder in mobile terminal A 340, bypasses the vocoder, thus allowing the signal data frames to pass directly in the digital trunk 360 without being altered. Similarly, base station 370 knowing that it receives compressed speech data frames, simply transmits the signal to the mobile terminal B 380 without any coding. The bypass method is fully described in the international application referred to earlier in this specification.

However, this solution is only valid for identical vocoders. With the rapid expansion of networks, the diversity of vocoders is quickly increasing. The bypass solution is therefore useful only for a small portion of connections involving tandem vocoding.

The present invention provides a method and a system for reducing the signal degradation that occurs when vocoders are connected in tandem during a call. The system features mechanisms and protocols for the conversion of compressed speech data frames to an intermediate common representation during a connection, whether between two mobile terminals or between a mobile terminal and a fixed wireless terminal.

Figure 4:
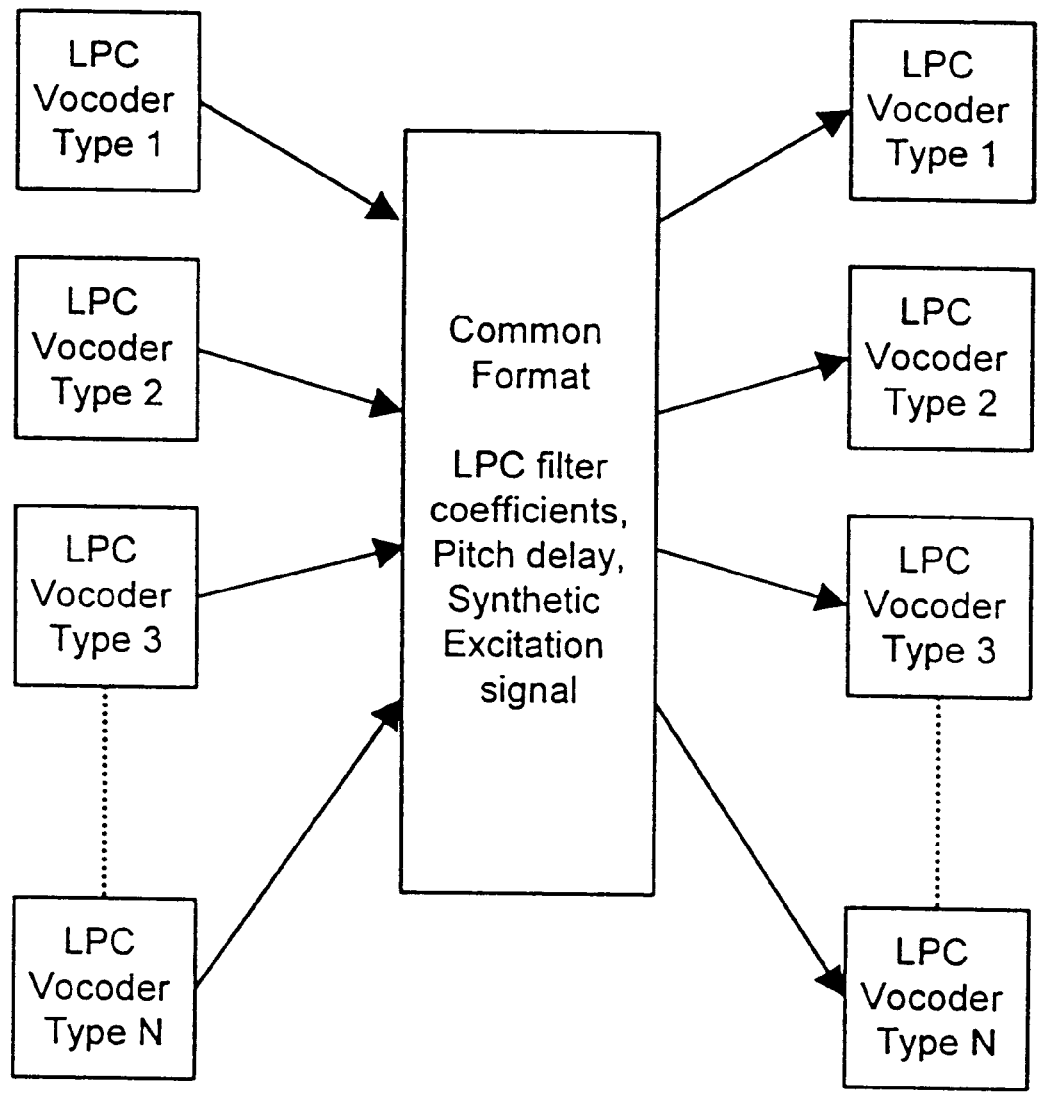
FIG. 4 is a block diagram of a system constructed in accordance with the present invention to translate compressed speech signal from one format to another via a common format without the necessity of de-compressing the signal to a PCM type digitization technique.

FIG. 4 shows a block diagram of a system constructed in accordance with the present invention to translate compressed speech signal from one format to another via a common format without the necessity of de-compressing the signal to a PCM type digitization technique.

Figure 5:
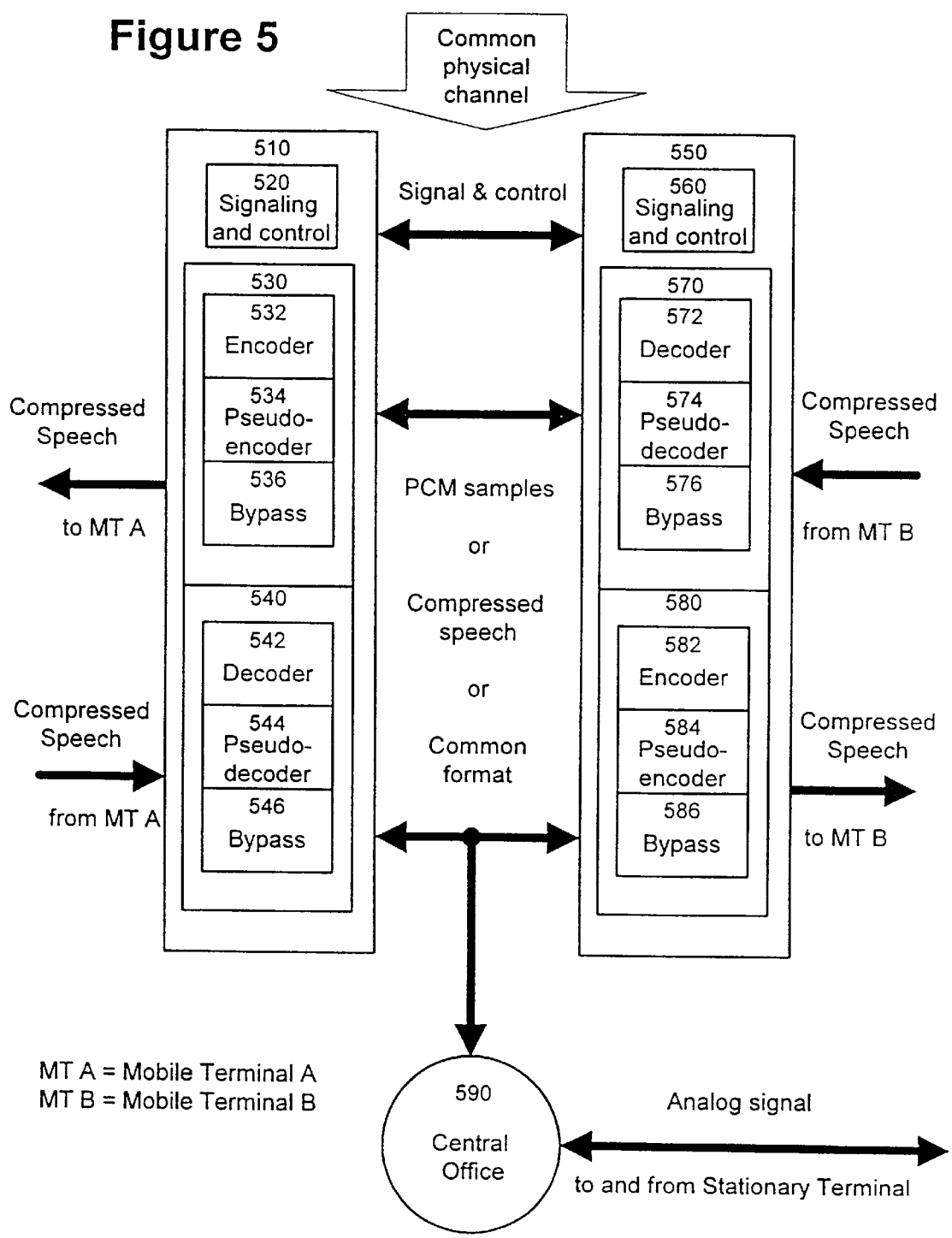
FIG. 5 is a more detailed block diagram of the system depicted in FIG. 4.

One specific embodiment of this system is depicted in FIG. 5 that is a block diagram showing a modular cross-transcoding system 510 having two transcoders having the same functional blocks, provided to implement the method in accordance with the invention. The transcoders are separate devices installed at the ends of the communication path to provide signal conversion functions. These signal conversion functions may be different depending on which communication standard the network is using. In a typical application, each transcoder may be associated with a base station of the network. Thus, a signal issued by one transcoder is transported over the telephone network toward the second transcoder where it is processed, as it will be described in detail later. Both transcoders have the same functional blocks. For simplicity, one transcoder will be described herein, and the description will apply to the other unit as well.

The transcoder 510 includes a signaling and control block 520, an encoding block 530 and a decoding block 540. The main function of the signaling and control block 520 is to communicate (or attempt to communicate) through PCM bit stealing (in-band signaling) or direct communications from a central database (out-of band signaling) with the entity at the other end of the link to determine if:

a) the connection terminates on an identical LPC-type vocoder, b) the connection terminates on a different LPC-type vocoder, c) the connection terminates on an entity not covered by a) or b) above (i.e. vocoder of another family type, new type of LPC vocoder, wireline terminal, etc.)

The decoding block 540 comprises a decoder 542, a pseudo-decoder 544 and a bypass section 546. Under the control of the signaling and control block 520, the decoding block 540 will perform one of the following tasks:

a) when the connection terminates on an identical LPC-type vocoder, send the compressed speech signal, from mobile terminal A, through the bypass section 546 which will passthrough the compressed speech data, possibly after reformatting, for transmission to the bypass section 586 of transcoder 550 toward mobile terminal B, b) when the connection terminates on a different LPC-type vocoder for which a transcoding module is available, apply the pseudo-decoder 544 to convert compressed speech data, from mobile terminal A, to a common-format signal for transmission to the pseudo-encoder 584 of transcoder 550, or c) when the connection terminates on a entity not covered by a) or b) above (i.e. vocoder of another family type, new type of LPC vocoder, wireline terminal, etc.), apply the speech decoder 542 to convert compressed speech data, from mobile terminal A, to PCM samples for transmission to the encoder 582 of transcoder 550 or the central office 590.

The encoding block 530 comprises an encoder 532, a pseudo-encoder 534 and a bypass section 536. Under the control of the signaling and control block 520, the encoding block 530 will perform one of the following tasks:

a) when the connection source has an identical LPC-type vocoder, send the speech signal, received from the bypass section 576 of transcoder 550, to the bypass section 536 which will passthrough compressed speech data, possibly after reformatting, for transmission to mobile terminal A to which the transcoder 510 is connected;

b) when the connection source has a different LPC-type vocoder for which a transcoding module is available, invoke the pseudo-encoder 534 to convert a common-format signal, received from the pseudo-decoder section 574 of transcoder 550, to compressed speech data and forward the signal to mobile terminal A, c) when the connection terminates on a entity not covered by a) or b) above (i.e. vocoder of another family type, new type of LPC vocoder, wireline terminal, etc.), apply the speech encoder 532 to convert PCM format samples, received from the decoder 572 of transcoder 550 or the central office 590, to compressed speech data and forward the compressed speech data to mobile terminal A.

The signaling and control block 520 in the transcoder 510 is designed to transmit messages toward the transcoder 550 and also to receive messages from transcoder 550 such as to properly adjust the transcoder operations in accordance with the data that is being received from or sent toward the transcoder 550. The communication between the two transcoders is effected through a communication channel established between them. The communication channel can be either in-band or out of band.

During PCM transmission, the process of bit stealing is used. This process consists of utilizing certain bits from certain speech samples to transmit signaling information. The location of the signaling bits and the bit robbing rate are selected to reduce the perceptual effect of the bit substitution, such that the audible signal at either one of the mobile terminals is not significantly affected. The receiving transcoder knows the location of the signaling bits in the speech samples and it is thus capable of decoding the message.

The handshaking procedure between the transcoders 510 and 550 involves the exchange of different messages that enables one transcoder to identify the companion transcoder, so every unit can be set in a mode allowing to produce the best possible speech quality. The handshaking procedure involves the exchange of the following messages:

a) the transmitter of the signaling and control block 520 embeds an identifier in the PCM speech signal issued by the transcoder 510. This identifier enables any remote transcoder to precisely determine the type of vocoder connected to the originating transcoder, namely the transcoder 510. The identification is effected by a database seeking operation, as it will be described hereafter.

b) the signaling and control block 560 examines the data frames received by the transcoder 550 and extracts any inband signaling information. This is effected by observing the bit values at the predetermined locations in the data frame. If the message is a transcoder identifier, a database (not shown in the drawings) is consulted to determine the type of vocoder connected to the transcoder issuing the message. Depending upon the contents of the message, the following possibilities arise:

1) the default mode for the encoding blocks 530 and 580, and the decoding blocks 540 and 570 is such that the encoders 532 and 582, and the decoders 542 and 572 are active, while the remaining functional modules, namely the pseudo-encoders 534 and 584, the pseudo-decoders 544 and 574, and the bypass sections 536, 546, 576 and 586 are inactive. This means that if the transcoder 510 (or 550) has not recognized the existence of a companion transcoder in the network, the transcoder will behave as a normal vocoder, namely it will convert compressed speech data received from the mobile terminal A to PCM samples that are input in the transport network. Similarly, the transcoder will expect to receive PCM samples from the transport network and will convert those samples in a compressed format compatible with the vocoder of the mobile terminal serviced by this transcoder;

2) if the signaling and control block 510, has identified the presence of a remote transcoder, the identifier of the transcoder is verified in the local database to determine the type of transcoder that is sending the messages. If:

i) the transcoder is identical, in other words the vocoder connected to the remote transcoder operates according to the same frame format or standard as the vocoder linked to the transcoder 510, the signal and control block 520 causes the decoding block to enable the bypass stage 546, while disabling the decoder 542 and the pseudo-decoder 544. Thus, any compressed speech data received from the remote transcoder will be directed to mobile terminal A without decoding. This mode of operation is the one that allows achieving the best possible voice quality since no vocoder tandeming occurs. The signal and control block 520 will also switch the encoding block 530 to a state in which the bypass 536 is active, while the encoder 532 and the pseudo-encoder 534 are inactive. Thus, compressed speech data received from mobile terminal A will be passed through the transcoder 510 without any decoding. It should be observed that the decision to switch the encoding block 530 to the bypass mode is based on the assumption that the signaling and control block 560 of the remote transcoder 550 has received the identifier of the transcoder 510 and has set the decoding block 570 and the encoding block 580 to the bypass mode also. In this case, full duplex connection is established between the transcoders that exchange compressed speech-signals.

ii) the transcoder is different, that is the remote transcoder indicates that the vocoder associated with mobile terminal B is of a different LPC-type, then the signaling and control block 520 enables the decoding block 540 to activate the pseudo-decoder 544, while disabling the decoder 542 and the bypass 546. In this mode of operation, the signaling and control block 520 expects to receive speech signals encoded in a common format that the pseudo-decoder 544 will transform into the format of the vocoder associated with the mobile station A. Also, the signaling and control block 520 will switch the encoding block 530 to a mode in which the pseudo-encoder 534 is active while the encoder 532 and the bypass 536 are inactive. Thus, the data issued by the transcoder 510 is in a common format that the pseudo-encoder 584 will encode in the format of the vocoder associated with the mobile terminal B.

Figure 6:
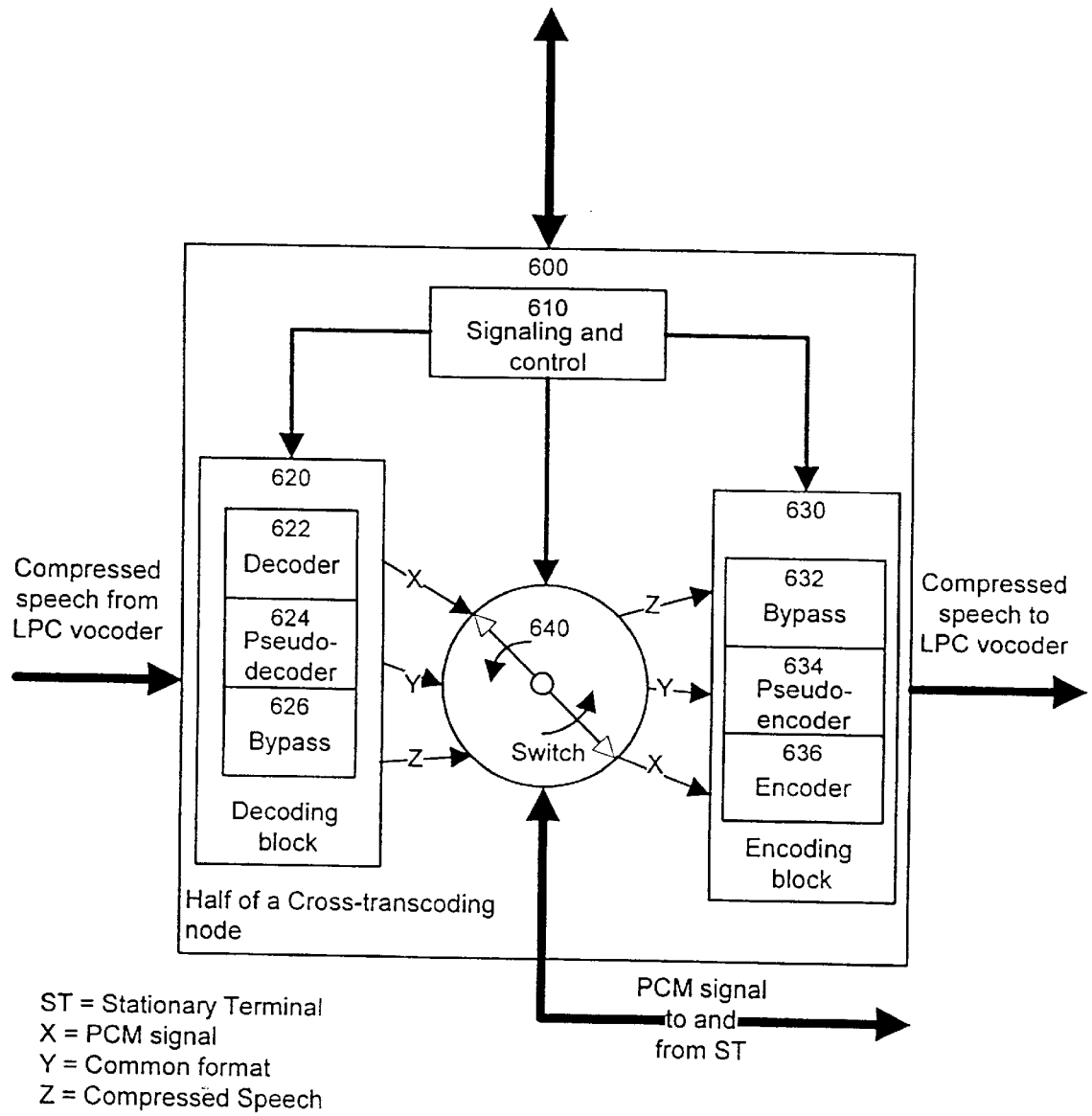
FIG. 6 is a block diagram of a cross-transcoding node, that constitutes a variant of the system depicted in FIG. 5.

A cross-transcoding node, such as depicted in FIG. 6, is yet another embodiment of this invention. Note that for purposes of clarity only half of the total cross-transcoding node is shown. The other half of the cross-transcoding node is identical and provides communication capabilities in the opposite direction. The cross-transcoding node 600 acts as a centralized interface between speech codecs that are different. In essence, the transcoding node 600 can be viewed as two pairs of transcoders physically connected to one another, rather than being separated from one another as described in the earlier embodiment. Instead of using a separate signaling and control block for each transcoder, a single signaling and control stage 610 is used. The cross-transcoding node 600 also includes a decoding block 620, an encoding block 630 and a switch 640.

The main function of the signaling and control block 610 is to communicate (or attempt to communicate) with the entity at the other end of the link to determine if:

a) the connection terminates on an identical LPC-type vocoder, b) the connection terminates on a different LPC-type vocoder for which a transcoding module is available, c) the connection terminates on a entity not covered by a) or b) above (i.e. vocoder of another family type, new type of LPC vocoder, wireline terminal, etc.).

Timing and synchronization information are used to control the decoding block 620 and the encoding block 630. Control information is used to select the correct position for switch 640 in order to route through the proper signal.

Decoding block 620 comprises a decoder 622, a pseudo-decoder 624 and a bypass section 626. Encoding block 630 comprises a bypass section 632, a pseudo-encoder 634 and an encoder 636.

When interconnecting two vocoders, the cross-transcoding node will function as described below. Under the control of the signaling and control block 610, the decoding block 620 will perform one of the following tasks:

a) when the connection terminates on an identical LPC-type vocoder, send the compressed speech signal to the bypass section 626 which will passthrough the speech data via the bypass section 632, possibly after reformatting, for transmission to the identical LPC-type vocoder, b) when the connection terminates on a different LPC-type vocoder for which a transcoding module is available, apply the pseudo-decoder 624 to convert compressed speech data to a common-format signal, then route the signal to the pseudo-encoder 634 to convert the common format back to a compressed signal and finally, send the compressed speech signal to the different LPC-type vocoder or c) when the connection terminates on a entity not covered by a) or b) above (i.e. vocoder of another family type, new type of LPC vocoder, wireline terminal, etc.), apply the speech decoder 622 to convert compressed speech data to PCM samples, then-route the signal to the encoder 636 to convert the PCM samples back to a compressed speech signal and finally, send the compressed speech signal to the end entity.

When connected to a wireline terminal, the cross-transcoding node will function as described below. When a PCM signal is incoming, it is routed to the switch 640, the signaling and control block 610 selects switching to forward the signal to the encoder 636 where the signal is converted to compressed speech and, finally, the compressed speech will be sent to the external vocoder. When a wireline terminal is on the receiving end of the communication and a compressed speech signal is incoming, the signal is routed to the decoder 622, where it is converted to PCM format, then, the signaling and control block selects switching to forward the signal to the wireline terminal.

The following description will now provide a specific example as to how the pseudo-encoder units effect the transformation from a compressed signal to a common format signal, as well as the reverse transformation, namely conversion from the common format to a compressed signal. More particularly, consider the situation where a speech signal is transformed when it is sent from mobile terminal (MT) A 340 to MT B 380. In this example, MT A uses a Vector-Sum Enhanced Linear Prediction (VSELP) vocoder in the IS 54 wireless telephony communication standard. FIG. 7*a* describes the frame format for IS 54. The signal is converted to a common format as per FIG. 7*b* and at the receiving end, MT B uses an Enhanced Full-Rate Coder (EFRC) in the IS 641 standard. FIG. 7*c* illustrates the frame format for IS 641.

Referring to FIGS. 3*b* and 5, for the transformation in this example, a speech signal is compressed (encoded) in the IS 54 standard by a VSELP vocoder located in MT A 340 and sent via a wireless link (RF channel A) to base station A 350 where it is transformed into the common format by the pseudo-decoder 544 in transcoder 510 (depicted in FIG. 5). The common format data frames are then sent via the telecommunication company network 360 to transcoder 550 where they are transformed to compressed speech in the IS 641 standard by the pseudo-encoder 584. The compressed signal is sent via a wireless link (RF channel B) to MT 380 where it is decoded by the second MT's EFRC vocoder. Audible speech is then available at MT 380.

Figure 8:
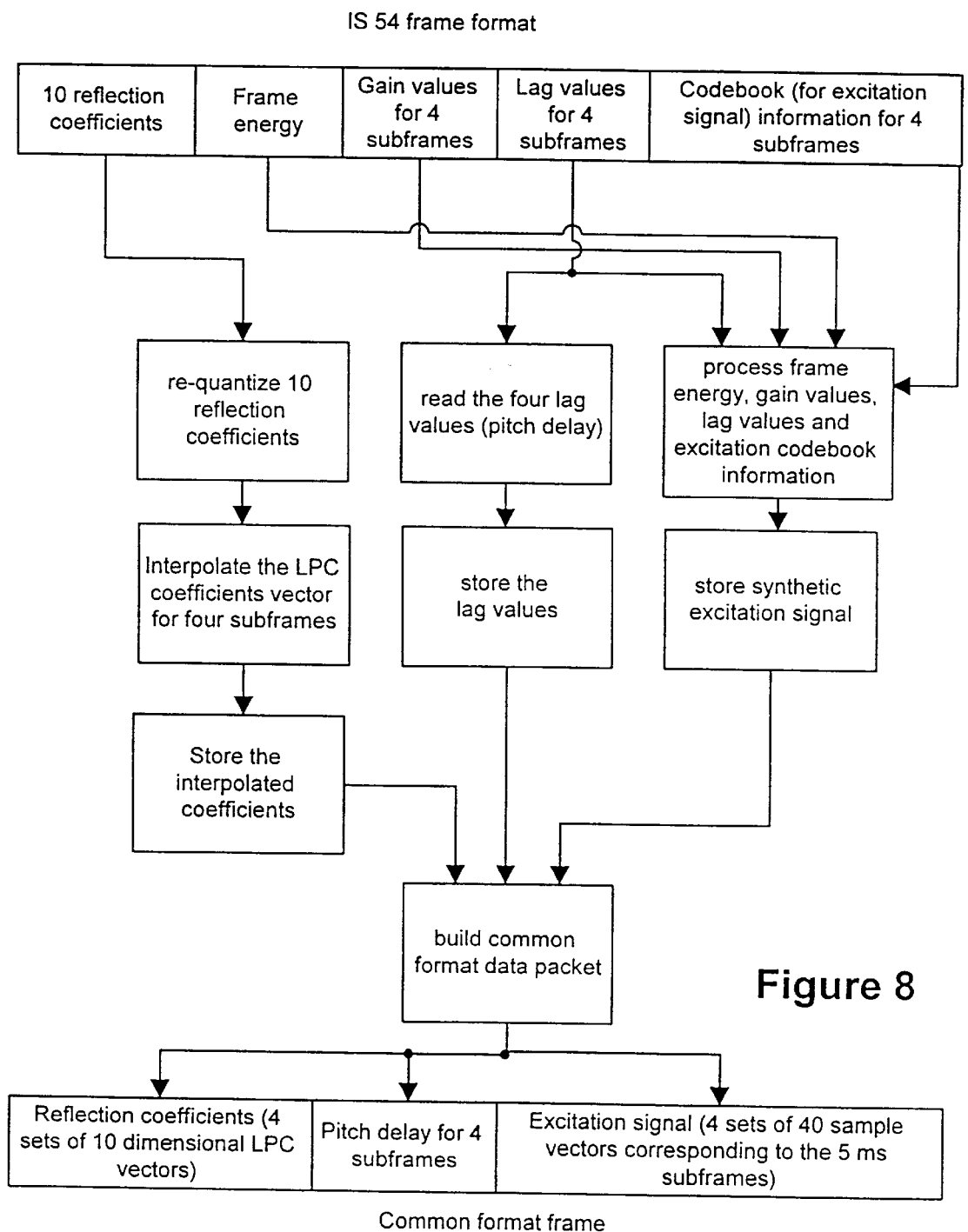
FIG. 8 is a flowchart of the operation to convert compressed speech data frame in the IS 54 format to the common format.

The pseudo-decoder 544, receiving a data frame of speech in the IS 54 format as shown at FIG. 7a, converts it as described below and also as illustrated by the flow chart of FIG. 8. The pseudo-decoder 544 recomputes the 10 dimensional vector representing the LPC reflection coefficient for the 20 ms data frame using its own quantizer. It then uses the 10 dimensional vector to determine the 4 sets of interpolated LPC coefficient vectors for the 4 subframes. The interpolation method is the same as the one described earlier. This part of the common format data frame is ready and the pseudo-decoder 544 stores it for future retrieval. The pseudo-decoder 544 then reads, from the compressed format, the 4 lag values (pitch delay). The pseudo-decoder 544 stores them for future insertion into the common format. The pseudo-decoder 544 then uses the codebook information, gain factors and pitch delays for the 4 subframes and the frame energy for the frame to create a synthetic excitation signal (4 times 40 samples) for the common format. Finally, the common format data frame is built by concatenating the excitation signal and the stored LPC filter coefficient and pitch delays. This data frame is sent to the pseudo-encoder 584 of the next base station. Note that on FIG. 7b, provisions have been made to reserve bits of information in the common format frame for energy and pitch prediction gain information. This information was not calculated in this particular example.

Figure 9:
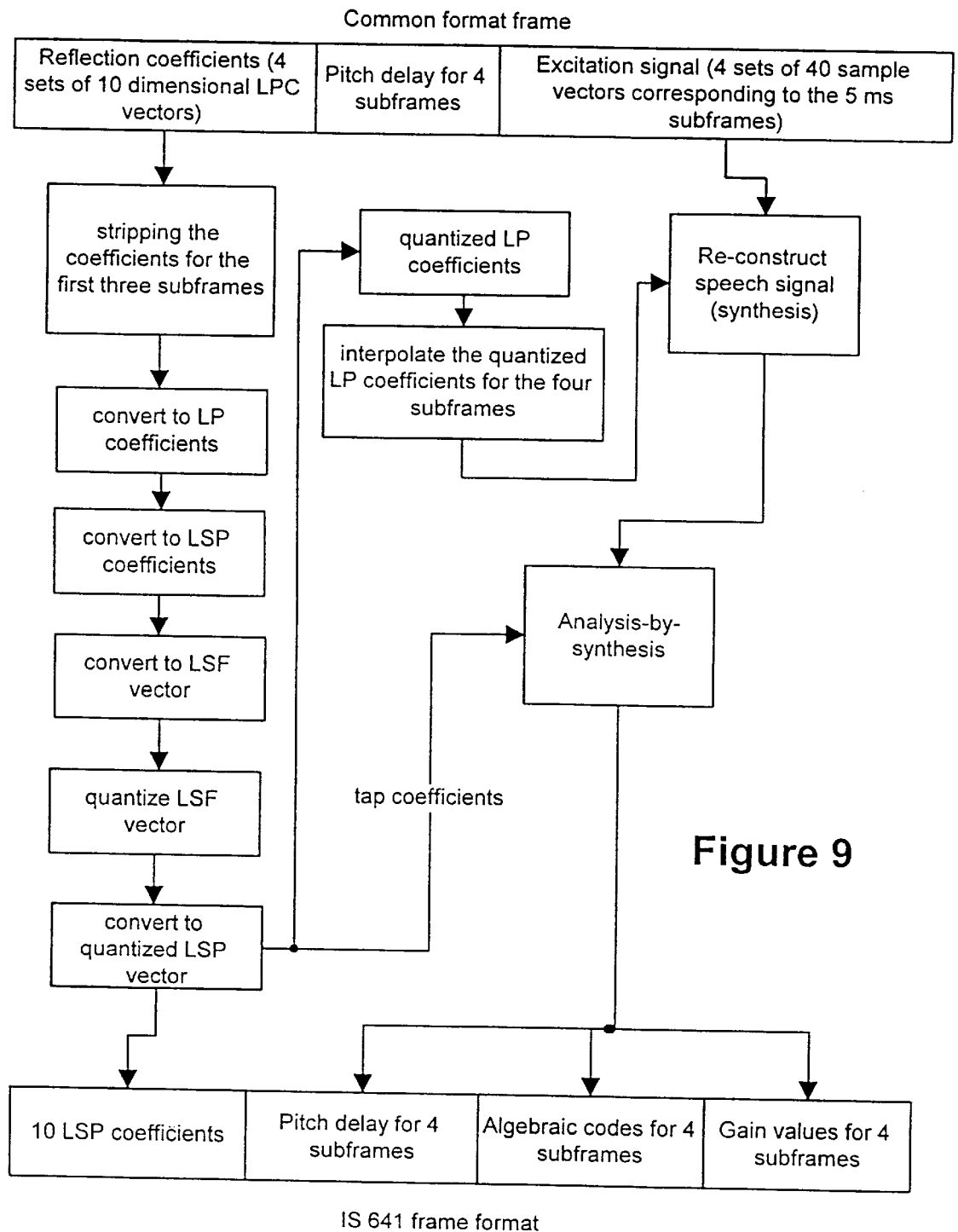
FIG. 9 is a flowchart of the operation to convert a data frame in the common format to the compressed speech format IS 641.

As shown in FIG. 9 the pseudo-encoder 584 receives the common format speech data frame and now needs to convert it to IS 641 compressed speech format in order for the EFRC at MT B to decode it properly. The pseudo-encoder 584 reads the LPC coefficient for the 4 subframes and discards the coefficient for the first three subframes keeping only the fourth subframe coefficient. Note that this is the LPC reflection coefficient vector computed for the whole frame. The first three vectors for the transformation in this specific example are not required since the EFRC vocoder at MT B will interpolate the first three subframe vectors according to the IS-641 interpolation scheme. All four vectors could be used though, for transformations involving other types of vocoders. At this point, the pseudo-encoder 584 requantizes the 4th subframe LPC reflection coefficient using its own quantizer. Before the pseudo-encoder presents the 10 LPC reflection coefficient to its quantizer, it needs to convert them into LP (linear prediction) coefficient first, then into Line Spectrum Pair (LSP) coefficient, and finally, into Line Spectral Frequencies (LSF vector). The LSF vector is then quantized and converted to a quantized LSP vector. This quantized LSF vector is part of the IS 641 format and is stored as is. Then, the pseudo-encoder 584 transforms the quantized LSP vector into quantized LP coefficient and interpolates the LP coefficient for the first three subframes. This set of LP coefficient vectors will be used in the next step.

The pseudo-encoder 584 uses the common format excitation signal and passes each of the four 40 sample subframes through a synthesis filter, using the quantized and interpolated LP coefficient as tap coefficient, to re-create the speech signal. From the speech signal, the pseudo-encoder 584 computes (in the same manner as a regular EFRC encoder would) pitch lag, gain and excitation values (algebraic code for MT B codebook), by utilizing the previously computed 10 LSP coefficient. Finally, the IS 641 compressed speech format frame is built using the quantized pitch delay, gain and excitation values and the stored LSP vector. This speech data frame is sent to the EFRC decoder in MT B where it will be convert into a speech signal as it would normally.

Note that the pitch delay information from the common format is not used in this example, but it can be used in other conversion. Instead, the pitch delay information was computed from the generated speech signal using known algorithms.

In summary, the pseudo-decoder 534 converts the incoming compressed speech signal into a common format, that has a coefficient part and an excitation part. That common format is then used by the pseudo-encoder to recreate the compressed speech but in a format different from the format of the compressed speech entering the pseudo-decoder 544. More specifically, the pseudo-encoder 584 builds, from the coefficient part in the common format signal, the coefficient of the compressed speech signal to be output by the pseudo-encoder 584. On the basis of the common format signal, the speech signal is re-created and used to extract any excitation or other information, that in conjunction with the coefficient calculated for the compressed speech signal is used to represent the speech information.

It will be noted that the pseudo-encoder and the pseudo-decoder of the transcoder 510 are designed in accordance with the type of vocoder with which it will interact. The common element is that each pseudo-decoder will accept a compressed speech signal and issue a common format signal that in turn will be transformed by the pseudo-encoder into another compressed speech signal format. This feature enables the system to be very flexible, particularly when new vocoders are introduced. It suffices to design a pseudo-encoder and a pseudo-decoder that will provide the transformation between the new vocoder signal format and the common format and vice-versa. There is no necessity to alter the existing transcoders in any way since the common format used by the system remains the same.

Figure 10:
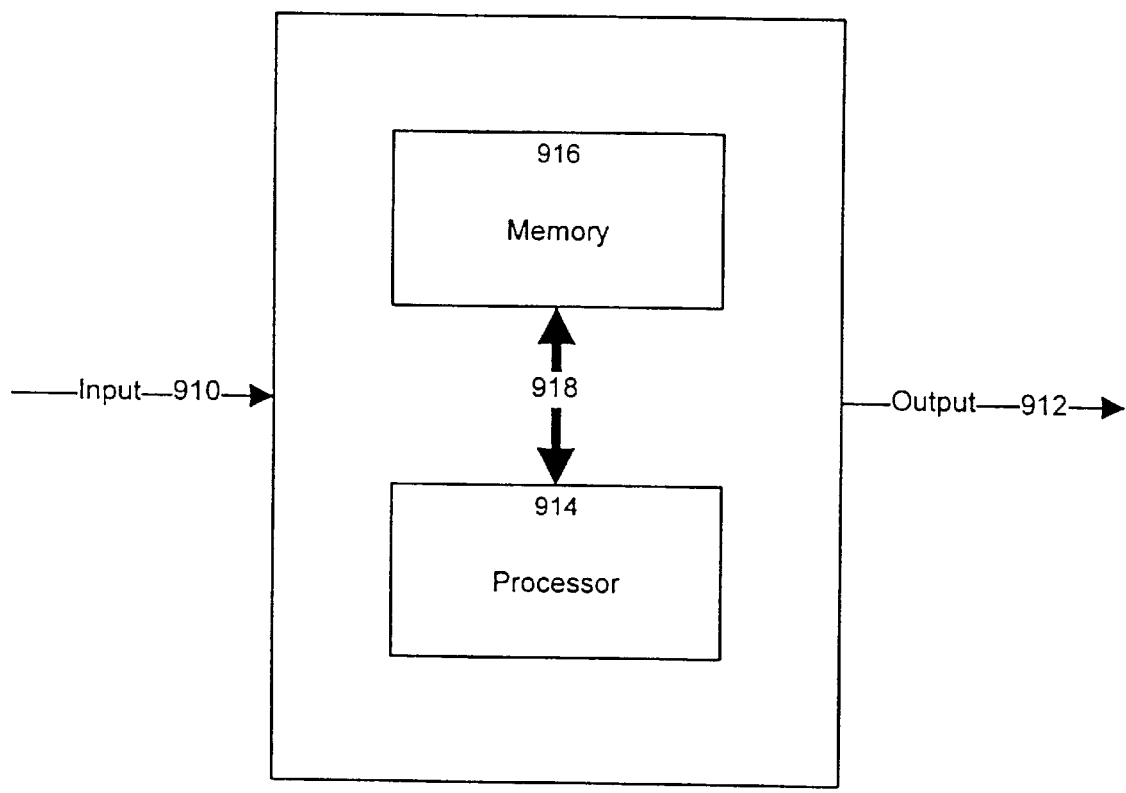
FIG. 10 is a block diagram of an apparatus for implementing the functionality of a pseudo-encoder of the type depicted in FIG. 5.

From a structural point of view, the apparatus illustrated at FIG. 10 can be used to implement the function of a pseudo-encoder 584 whose operation was detailed above in connection with FIG. 9. The apparatus comprises an input signal line 910, a signal output line 912, a processor 914 and a memory 916. The memory 916 is used for storing instructions for the operation of the processor 914 and also for storing the data used by the processor 914 in executing those instructions. A bus 918 is provided for the exchange of information between the memory 916 and the processor 914.

Figure 11:
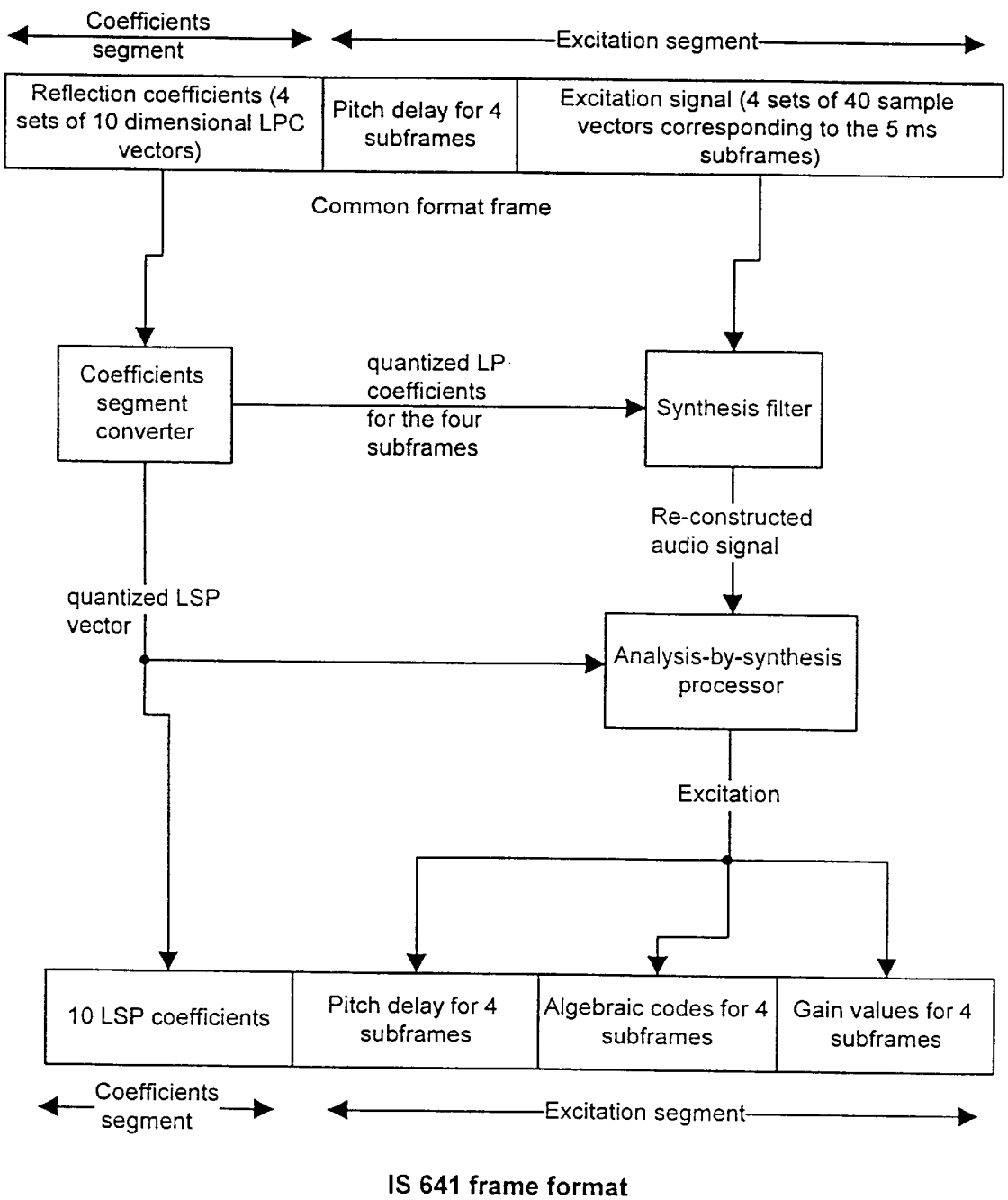
FIG. 11 is functional block diagram of the apparatus shown in FIG. 10.

The instructions stored in the memory 916 allow the apparatus to operate according to the functional block diagram illustrated at FIG. 11. The apparatus includes a coefficient segment converter that, as described in connection with FIG. 9 converts through known mathematical manipulations the coefficient segment from the common format frame into the coefficient segment of the compressed audio signal frame, in this example in the IS 641 frame format. The apparatus also includes a synthesis filter that receives from the coefficient segment converter quantized LPC coefficient for the four sub frames. The synthesis filter also receives the excitation signal from the excitation segment of the common format frame in order to construct the audio signal. That signal is then input. into an analysis-by-synthesis process that generates the excitation segment for the IS 641 frame format, by using as tap coefficient the quantized LSP vector output by the coefficient segment converter.

Figure 12:
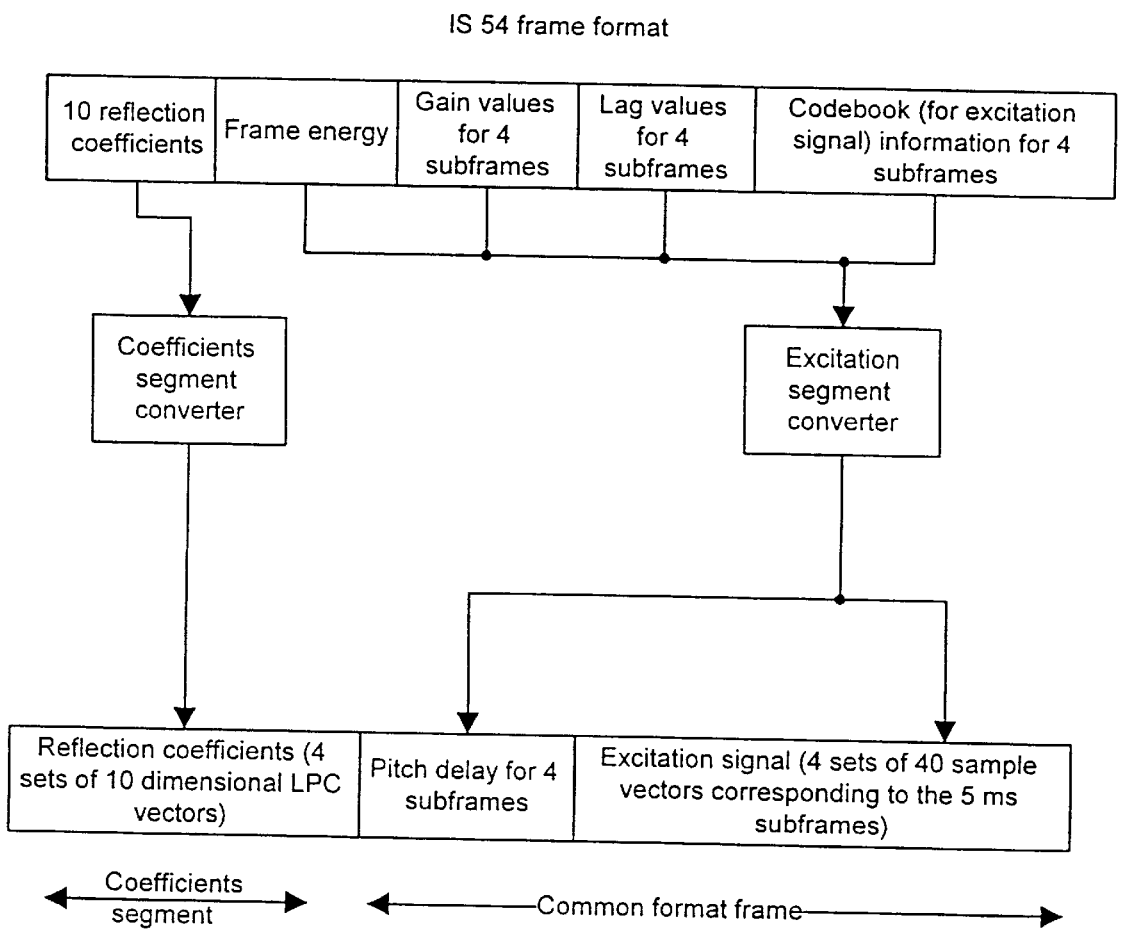
FIG. 12 is a functional block diagram of a variant of the apparatus shown in FIG. 10.

FIG. 12 illustrates the block diagram of the pseudo-decoder 544 illustrated at FIG. 5. The apparatus includes two main functional blocks, namely a coefficient segment converter that receives the coefficient segment from the data frame in the IS 54 format and converts it into the coefficient segment of the common format data frame. The apparatus also includes an excitation segment converter that uses the elements of the excitation segment from the IS 54 data format to convert it into the excitation segment of the common format data frame. The approach in this design is to treat all segments of the data frame of compressed audio signal to build the data frame of common format.

When designing a transcoder for a particular application, the pseudo-encoder and the pseudo-decoder can be constructed by using one of the devices depicted at FIGS. 11 and 12. The choice of either system will depend upon the particular format translation to be effected. When the format of the compressed audio signal (either the source data frame or the destination data frame) is such that the -coefficient segment and the excitation segment from the source data frame can be processed independently to effect the translation to the destination data frame, the apparatus depicted at FIG. 12 is probably best suited for the operation. On the other hand, when a re-construction of the audio signal is more appropriate, then the apparatus depicted at FIG. 11 should be employed.

As to the construction of the encoder and bypass stages of each transcoder, they can be built in accordance with systems that are presently known to those skilled in the art. More specifically, the encoder and the decoder can be constructed in accordance with the block diagrams of FIGS. 1 and 2, respectively, while the bypass mechanism can be designed in accordance with the disclosure of the international application referred to earlier.

The above description of a preferred embodiment should not be interpreted in any limiting manner since variations and refinements can be made without departing from the spirit of the invention. The scope of the invention is defined in the appended claims and their equivalents.

We claim:

1. An apparatus for processing audio signals, said apparatus comprising an input and an output, said apparatus being responsive to a frame of compressed audio data of a first format applied to said input to generate at said output a frame of compressed audio data of a second format, the frame of first format having a coefficient segment and an excitation segment, the frame of the second format having a coefficient segment and an excitation segment, said apparatus including:
   a) first processing unit connected to said input for receiving a coefficient segment of the frame of compressed audio data of the first format and issuing on said output the coefficient segment of the frame of compressed audio data of the second format;
   b) second processing unit connected to said input for generating from the data frame of compressed audio data of the first format the excitation segment of the data frame of compressed audio data of the second format.

2. An apparatus as defined in claim 1, wherein said first processing unit issues the coefficient segment of the frame of compressed audio data of the second format without making any substantial utilization of the excitation segment in the data frame of compressed audio data of the first format.

3. An apparatus as defined in claim 2, wherein said first processing unit includes a quantizer.

4. An apparatus as defined in claim 1, wherein said second processing unit includes a quantizer.

5. An apparatus as defined in claim 1, wherein said second processing unit computes the excitation segment of the data frame of compressed audio data of the second format without making any substantial utilization of the coefficient segment of the data frame of compressed audio data of the first format.

6. An apparatus as defined in claim 1, wherein said second processing unit includes a filter.

7. An apparatus as defined in claim 6, wherein said filter includes a first input for receiving a re-constructed audio signal and a second input for receiving a coefficient segment of the data frame of compressed audio data of the second format.

8. An apparatus as defined in claim 1, wherein the first format is IS 54.

9. An apparatus as defined in claim 1, wherein the first format is IS 641.

10. An apparatus for transmitting a data frame of compressed audio information, said apparatus including:
    a) a first transcoder including a first input and a first output, said first transcoder being responsive to a frame of compressed audio data of a first format applied to said input to generate at said output a frame of compressed audio data of a second format, the frame of first format having a coefficient segment and an excitation segment, the frame of the second format having a coefficient segment and an excitation segment;
    b) a second transcoder including a second input and a second output, said second input being linked to said first output to receive the frame of compressed audio data of a second format, said second transcoder being responsive to a frame of compressed audio data of a second format applied to said second input to generate at said second output a frame of compressed audio data of a third format, the frame of third format having a coefficient segment and an excitation segment.

11. An apparatus as defined in claim 10, wherein said first transcoder includes:
    a) first processing unit connected to said first input for receiving a coefficient segment of the frame of compressed audio data of the first format and issuing on said first output the coefficient segment of the frame of compressed audio data of the second format;
    b) second processing unit connected to said first input for generating from the data frame of compressed audio data of the first format the excitation segment of the data frame of compressed audio data of the second format.

12. An apparatus as defined in claim 11, wherein said first processing unit issues the coefficient segment of the frame of compressed audio data of the second format without making any substantial utilization of the excitation segment in the data frame of compressed audio data of the first format.

13. An apparatus as defined in claim 12, wherein said first processing unit includes a quantizer.

14. An apparatus as defined in claim 12, wherein said second processing unit includes a quantizer.

15. An apparatus as defined in claim 12, wherein said second processing unit computes the excitation segment of the data frame of compressed audio data of the second format without making any substantial utilization of the coefficient segment of the data frame of compressed audio data of the first format.

16. An apparatus as defined in claim 12, wherein said second processing unit includes a filter.

17. An apparatus as defined in claim 16, wherein said filter includes a first input for receiving a re-constructed audio signal and a second input for receiving a coefficient segment of the data frame of compressed audio data of the second format.

18. An apparatus as defined in claim 10, wherein said second transcoder includes:
   a) third processing unit connected to said second input for receiving a coefficient segment of the frame of compressed audio data of the second format and issuing on said second output the coefficient segment of the frame of compressed audio data of the third format;
   b) fourth processing unit connected to said second input for generating from the data frame of compressed audio data of the second format the excitation segment of the data frame of compressed audio data of the third format.

19. An apparatus as defined in claim 18, wherein said third processing unit issues the coefficient segment of the frame of compressed audio data of the third format without making any substantial utilization of the excitation segment in the data frame of compressed audio data of the second format.

20. An apparatus as defined in claim 19, wherein said third processing unit includes a quantizer.

21. An apparatus as defined in claim 19, wherein said fourth processing unit includes a quantizer.

22. An apparatus as defined in claim 18, wherein said fourth processing unit computes the excitation segment of the data frame of compressed audio data of the third format without making any substantial utilization of the coefficient segment of the data frame of compressed audio data of the second format.

23. An apparatus as defined in claim 18, wherein said fourth processing unit includes a filter.

24. An apparatus as defined in claim 23, wherein said filter includes an input for receiving a re-constructed audio signal and an input for receiving a coefficient segment of the data frame of compressed audio data of the third format.

25. A method for processing a data frame representative of audio information in digitized and compressed form, the data frame including a coefficient segment and a excitation segment, the data frame being in a first format, said method comprising the steps of:
   a) processing the coefficient segment of the data frame in the first format to generate a coefficient segment of a data frame in a second format;
   b) processing the data frame in the first format to generate an excitation segment of a data frame in a second format;
   c) combining the coefficient segment of a data frame in a second format with the excitation segment of a data frame in a second format generated at steps a) and b), respectively to generate a data frame of a second format representative of the audio information contained in the data frame of the first format.

26. A method as defined in claim 25, wherein the step of generating an excitation segment of a data frame in a second format comprises the steps of:
   a) synthesizing an audio signal at least partly on information contained in the excitation segment of the data frame;
   b) analyzing the audio signal synthesized at step a) to generate at least part of the excitation segment of a data frame in a second format.

27. A method as defined in claim 26, comprising the step of passing the audio signal synthesized at step a) of claim 26 through a filter and supplying to said filter as tap coefficient in the coefficient segment of a data frame in said second format.

28. A method as defined in claim 25, wherein the generation of the excitation segment of a data frame in a second format is obtained solely by transformation of the excitation segment of a data in a first format.

29. A method as defined in claim 25, wherein the generation of the coefficient segment of a data frame of a second format is obtained solely by transformation of the coefficient segment of a data frame in a first format.

30. A method of transmission of a data frame representative of audio information in digitized and compressed form, the data frame including a coefficient segment and a excitation segment, the data frame being in a first format, said method comprising the steps of:
   a) processing at a first site the data frame in the first format to generate a data frame of a second format, the data frame of a second format including a coefficient segment and a excitation segment;
   b) transmitting the data frame of a second format to a second site remote from said first site;
   c) processing at said second site the data frame of a second format to generate a data frame of a third format, the data frame of a second format including a coefficient segment and a excitation segment.

31. A method as defined in claim 30, comprising the steps of:
   a) processing at said first site the coefficient segment of the data frame in the first format to generate a coefficient segment of a data frame in a second format;
   b) processing at said first site the data frame in the first format to generate an excitation segment of a data frame in a second format;
   c) combining the coefficient segment of a data frame in a second format with the excitation segment of a data frame in a second format generated at steps a) and b), respectively to generate a data frame of a second format representative of the audio information contained in the data frame of the first format.

32. A method as defined in claim 31, comprising the steps of:
   a) processing at said second site the coefficient segment of the data frame in the second format to generate a coefficient segment of a data frame in a second format;
   b) processing at said second site the data frame in the second format to generate an excitation segment of a data frame in a third format;
   c) combining the coefficient segment of a data frame in a third format with the excitation segment of a data frame in a third format generated at steps a) and b), respectively to generate a data frame of a third format representative of the audio information contained in the data frame of the first format and the second format.

33. A method for transmitting audio signals between incompatible vocoders, said method comprising the steps of:
   a) receiving from a first vocoder a data frame of a first format, the data frame including a coefficient segment and an excitation segment;
   b) converting the data frame of a first format into a data frame of intermediate format that includes the sub-steps of:
      i) processing the coefficient segment of the data frame in the first format to generate a coefficient segment of a data frame in the intermediate format;

ii) processing the data frame in the first format to generate an excitation segment of a data frame in the intermediate format;

iii) combining the coefficient segment of a data frame in the intermediate format with the excitation segment of a data frame in the intermediate format to generate a data frame of an intermediate format representative of the audio information contained in the data frame of the first format;

c) converting the data frame of an intermediate format into a data frame of a third format that includes the sub-steps of:

i) processing the coefficient segment of the data frame in the intermediate format to generate a coefficient segment of a data frame in the third format;

ii) processing the data frame in the intermediate format to generate an excitation segment of a data frame in the third format;

iii) combining the coefficient segment of a data frame in the third format with the excitation segment of a data frame in the third format to generate a data frame of a third format representative of the audio information contained in the data frame of the first format and of the intermediate format;

d) transmitting the data frame of the third format to a second vocoder.

34. A machine readable storage medium containing a program element for instructing a computer to process audio signals, said computer comprising an input and an output, said program element causing said computer to be responsive to a frame of compressed audio data of a first format applied to said input to generate at said output a frame of compressed audio data of a second format, the frame of first format having a coefficient segment and an excitation segment, the frame of the second format having a coefficient segment and an excitation segment, said program element implementing in said computer functional blocks including:

a) first processing unit connected to said input for receiving a coefficient segment of the frame of compressed audio data of the first format and issuing on said output the coefficient segment of the frame of compressed audio data of the second format;

b) second processing unit connected to said input for generating from the data frame of compressed audio data of the first format the excitation segment of the data frame of compressed audio data of the second format.

35. An inter-vocoder interfacing node for converting a frame of compressed audio signal in a first format to a frame of compressed audio signal in a second format, the frame of first format having a coefficient segment and an excitation segment, the frame of the second format having a coefficient segment and an excitation segment, said node including:

a) a first transcoder including a first input and a first output, said first transcoder being responsive to a frame of compressed audio data of a first format applied to said input to generate at said output a frame of compressed audio data of a intermediate format, the frame of the intermediate format having a coefficient segment and an excitation segment;

b) a second transcoder including a second input and a second output, said second input being linked to said first output to receive the frame of compressed audio data of an intermediate format, said second transcoder being responsive to a frame of compressed audio data of a intermediate format applied to said second input to generate at said second output a frame of compressed audio data of a second format.

* * * * *